United States Patent [19]

Canup

[11] 4,174,695
[45] Nov. 20, 1979

[54] AC TYPE IGNITION SYSTEM WITH TWO TIME DELAY CIRCUITS

[75] Inventor: Robert E. Canup, Poughkeepsie, N.Y.

[73] Assignee: Texaco Inc., White Plains, N.Y.

[21] Appl. No.: 844,954

[22] Filed: Oct. 25, 1977

[51] Int. Cl.² ............................ F02P 5/02; F02P 1/00
[52] U.S. Cl. ............................ 123/148 E; 315/209 T
[58] Field of Search ................ 123/117 R, 148 E; 315/209 T

[56] References Cited

U.S. PATENT DOCUMENTS

| | | | |
|---|---|---|---|
| 3,943,896 | 3/1976 | Green et al. | 123/148 E |
| 4,022,177 | 5/1977 | Canup et al. | 123/148 CB |
| 4,106,440 | 8/1978 | Lai et al. | 123/148 E |
| 4,117,820 | 10/1978 | Kashiwazaki et al. | 123/148 E |

Primary Examiner—Stuart N. Hecker
Attorney, Agent, or Firm—Thomas H. Whaley; Carl G. Ries; Henry C. Dearborn

[57] ABSTRACT

An electronic control circuit incorporated with an AC type ignition system which employs a high-frequency continuous-wave oscillator. The system includes a control winding on a transformer that has a high voltage spark signal output winding. There is a transistor in series with the control winding, to switch on and off a circuit that controls the starting and stopping of the oscillator. And, there are a pair of time delay circuits which produce delay times that are inversely proportional to the speed of an internal combustion engine that uses the ignition system. These time delay circuits may be connected so as to use only one of them. Or, they may be connected in series, so that a desired step timing change may be introduced (or not) upon demand.

4 Claims, 1 Drawing Figure

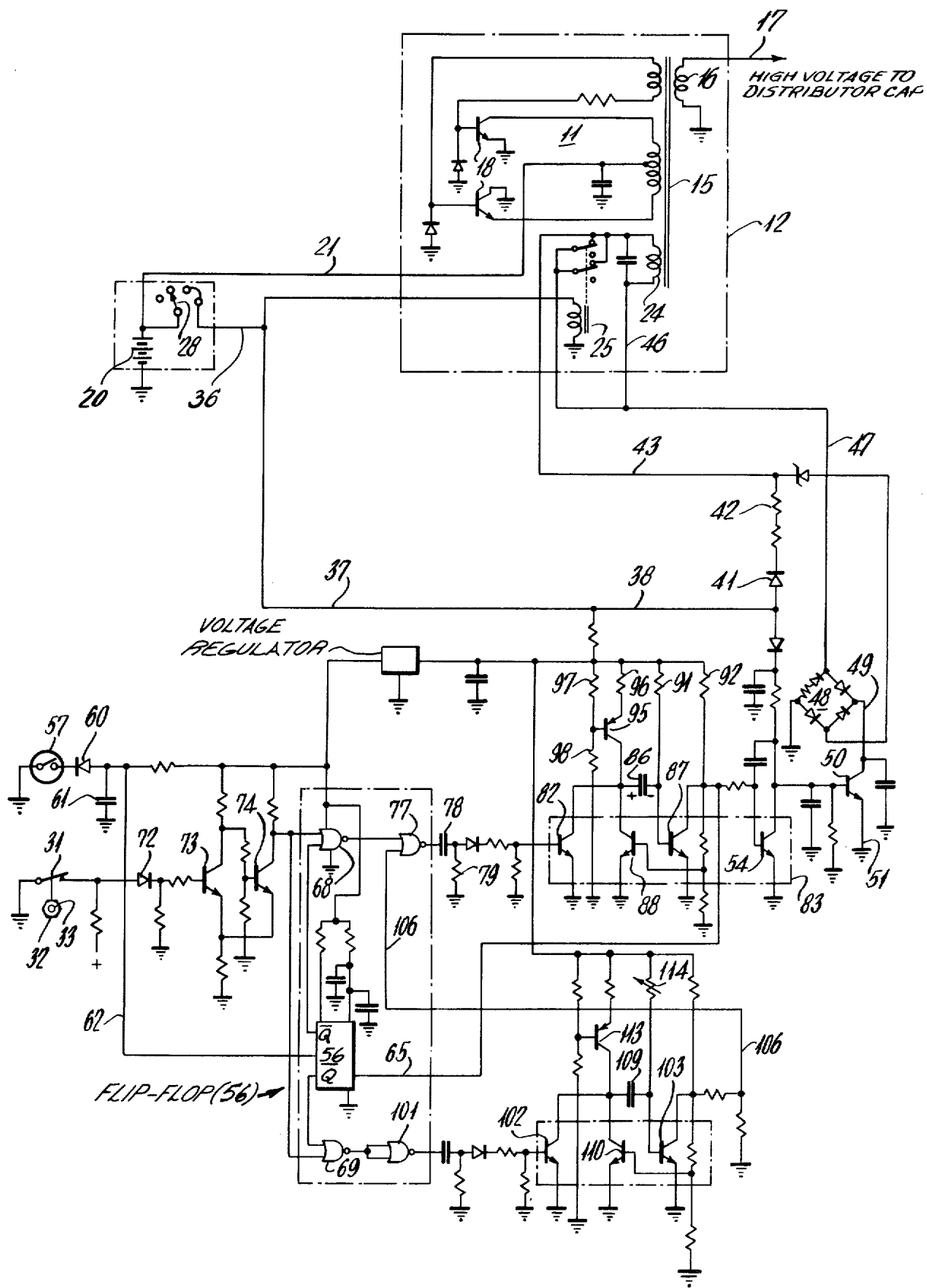

AC TYPE IGNITION SYSTEM WITH TWO TIME DELAY CIRCUITS

CROSS-REFERENCES TO RELATED APPLICATIONS

This application is related in subject matter to my earlier U.S. Pat. No. 3,818,885 issued June 25, 1974 and to an application Ser. No. 779,118 filed Mar. 18, 1977, now abandoned, on a joint invention of mine.

BACKGROUND OF THE INVENTION

1. Field of the Invention

This invention concerns an ignition system for internal combustion engines, in general. More specifically, it deals with a particular type of ignition system which employs a high-frequency continuous-wave oscillator to supply a controlled-duration spark signal.

2. Description of the Prior Art

A high-frequency continuous-wave ignition system has been developed which is particularly well adapted to provide a controlled spark-duration signal. However, in the case where it was desired to provide for a step change in the timing of the spark signals, relative to the engine rotation, it was found necessary to employ a pair of sensors that were fixed relative to the crank angle of the engine. The arrangement was such that one or the other sensor would generate the timing signals to control the ignition spark outputs. Such arrangement is shown in a U.S. Pat. No. 4,022,177 issued May 10, 1977. The above noted application discloses a system that is applicable to the same type of ignition signal, and it can produce a controlled-duration AC spark signal that will last for an interval that covers a particular amount of crank angle degrees irrespective of the speed of operation of the engine.

On the other hand, this invention provides a system such that only a single sensor need be employed to initiate the spark timing. And, a predetermined step change in such timing may be chosen at will, which step will maintain a given crank angle timing position irrespective of the speed of the crank shaft.

SUMMARY OF THE INVENTION

Briefly, the invention is in combination with a controlled-spark-duration ignition system for an internal combustion engine. The said system has a high-frequency continuous-wave oscillator including a transformer having a high voltage output winding which is adapted for connection to a sparking circuit. There is an oscillator control winding on said transformer for starting and stopping oscillation, and there is an electronic switch means which comprises a transistor connected in series with said oscillator control winding. The system also has trigger means for switching said transistor from conducting to non-conducting state and back. Also, there is means for producing an engine timed signal for controlling said trigger means. The invention relates to the improvement that comprises a pair of electrical time-duration control means each for producing a time delay that is inversely proportional to the speed of said engine. It also comprises circuit means for alternatively connecting only one or both of said time duration control means in series between said engine timed signal and said trigger means.

Again briefly, the invention is in combination with a controlled-spark-duration ignition system for an internal combustion engine. The said system has a high-frequency continuous-wave oscillator including a transformer having a high-voltage output winding adapted for connection to a sparking circuit. The system also has an oscillator control winding on said transformer for starting and stopping oscillation, and electronic switch means which comprises a transistor connected in series with said oscillator control winding. The system also has trigger means for switching said transistor from conducting to non-conducting state and back, and means for producing an engine timed signal for controlling said trigger means. The invention concerns the improvement that comprises a pair of electrical time duration control means each of which comprises a first transistor having an input connected to receive said engine timed signal for producing an initiating pulse to said time duration control means, and a capacitor having one side connected to said first transistor output for transmitting said initiating pulse to a second transistor input. The improvement also comprises a third transistor having its output connected in parallel with said first transistor output and its input connected to the output of said second transistor for making said third transistor conduct so long as said second transistor is non-conducting, and a fourth transistor connected as a constant current generator feeding said one side of said capacitor. The control means also comprises a resistor connected to said second transistor input for controlling the time duration of said second transistor's non-conducting state. The improvement also comprises a flip-flop, and a switch for determining the state of said flip-flop. The improvement also comprises a pair of NOR gates controlled by the state of said flip-flop, and first circuit means for connecting said switch to said flip-flop. The improvement additionally comprises second circuit means for connecting only one of said time duration control means between said engine timed signal producing means and said trigger means when said flip-flop is in one state, and for connecting both of said time duration control means in series between said engine timed signal producing means and said trigger means when said flip-flop is in the other state.

BRIEF DESCRIPTION OF THE DRAWING

The foregoing and other objects and benefits of the invention will be more fully set forth below in connection with the best mode contemplated by the inventor of carrying out the invention, and in connection with which there are illustrations provided in the drawing, wherein:

The FIGURE of drawings is an electrical schematic illustrating an ignition system according to the invention.

DESCRIPTION OF THE PREFERRED EMBODIMENT

With reference to the FIGURE of drawings, it may be noted that the particular type of ignition system to which this invention applies, has a high frequency oscillator 11 which is part of a unit 12 that is shown in dashed lines. This unit 12 is substantially like the corresponding portion of the ignition system shown in the aforementioned U.S. Pat. No. 3,818,885. The unit includes a transformer 15 that has a high voltage output winding 16 thereon. One end of the winding 16 is connected to a circuit connection 17 that leads to the distributor cap, as indicated by the caption.

The oscillator 11 is a known type. It employs a pair of transistors 18, and it develops square wave AC signals in a manner which is clearly described in the aforementioned patent. Consequently, no further details are needed here. It may be noted that the power supplied for the oscillator 11 is directly connected from a battery 20 to the oscillator via a permanent circuit connection 21.

Control of the starting and stopping of the oscillator 11 is had by a control winding 24 on the transformer 15. And, this aspect is also described in the aforementioned patent. Loading of the control winding 24 prevents oscillation of the oscillator 11. While, removal of the load along with application of a DC bias current, insures instantaneous starting of the oscillator 11 at the beginning of each spark signal duration. Also, it may be noted that there is provided a relay 25 that is controlled by an ignition switch 28, so that whenever the ignition switch is turned off the relay 25 will be deactivated into the switch contacts position that is illustrated in the FIGURE of the drawing. Consequently, there will be a direct short circuit connection across the control winding 24. This makes sure that the oscillator 11 remains shut down whenever the engine is turned off.

Whenever the ignition switch 28 is turned on for providing spark signals to the internal combustion engine to which the ignition system applies, the relay 25 will be energized so as to remove the direct short circuit indicated above. This allows the ignition system to operate under the control of the timing unit, e.g. breaker points 31 that are actuated by a cam 32 which is driven by a timing shaft 33 that is directly connected to the crank shaft (not shown) of the engine in a conventional manner. When the system is thus operating, the starting and stopping of oscillator 11 is controlled by the control winding 24 in the manner indicated and described in the above patent. Briefly, it provides for having a bias current flow through the control winding 24 during the oscillator loading conditions, and the loading prevents oscillation of the oscillator 11. The DC bias current flows over a circuit which includes the ignition switch 28 and circuit connections 36, 37 and 38 to a diode 41 and a resistor 42. It also includes a circuit connection 43 that goes to one end of the control winding 24. From the other end of winding 24, the bias current circuit is completed via circuit connections 46 and 47 that go to one corner of a diode bridge 48. An adjacent corner of the bridge 48 is connected via a connection 49 to one electrode of a control transistor 50. The other current electrode of the transistor 50 is connected to ground via a circuit connection 51. And, the circuit is completed from ground to one side of the battery 20. The other side of the battery is, of course, connected to the ignition switch 28.

When the DC bias current circuit just described is opened, by reason of having the transistor 50 go to its non-conducting state, the oscillator 11 is instantaneously and positively started and it continues to oscillate until transistor 50 goes conducting one more. Thus, transistor 50 acts as an electronic switch means, which controls the duration of ignition signals that are delivered at the output circuit 17 from high voltage winding 16.

It may be noted that there is a transistor 54 that is connected to the input of the transistor 50 for controlling the state of conduction or non-conduction thereof. Thus, the transistor 54 may be considered as a trigger means which is for switching the control transistor 50.

When the transistor 54 is conducting the transistor 50 will be cut off, or non-conducting, and it is during such state that the oscillator 11 is turned on and the spark signal is being delivered.

The intervals when the spark signals take place are under control of the engine timed signal, which, of course, is developed by any feasible engine timed signal generating structure, e.g., that indicated above which includes the breaker points 31 as controlled by the cam 32 driven by the timing shaft 33. However, similarly as in regard to the system disclosed and described in the aforementioned copending application Ser. No. 779,118 filed Mar. 18, 1977, the spark signal time duration is thus controlled only at the initiation thereof by the engine timed signal. Thereafter, the duration is determined by an electrical time-duration control. In this manner, an exact crank angle degree signal duration is obtained, without relying upon the reclosing of the breaker points. The electrical time duration control produces a time delay that is inversely proportional to the speed of the engine and consequently may be set to provide the desired crank angle degree duration.

In this invention there is a provision for alternatively connecting only one of the foregoing time duration control means, or both of a pair of such means in series. Consequently, the advantages of a stepwise timing retard or advance control feature, may be obtained along with the ability to control the spark signal duration for a given crank angle degree interval irrespective of the speed of the engine. Such alternative connection of the time delay systems is carried out by having a flip-flop 56 that is connected to a switch 57 for determining the state of the flip-flop 56. Switch 57 may be actuated in relation to the load conditions on the engine, if desired. Thus, it may be mechanically connected to the accelerator (not shown) of the engine. It will provide a control signal input to the flip-flop 56, via a diode 60 and capacitor 61. The input to flip-flop 56 is carried over a circuit connection 62. However, as was explained in the above noted U.S. Pat. No. 4,022,177, the state of flip-flop 56 does not change until a clocking pulse has been received thereafter. Such clocking pulse goes over a circuit connection 65 which connects to the input circuit of the trigger transistor 54, mentioned above. Consequently, the change to step the timing from one position to another, either retard or advance, will not take place during the interval when a spark signal is being generated. Thus, there will not be any spark missed during a change of the stepwise advance or retard spark control.

The flip-flop 56 controls the state of a pair of NOR gates 68 and 69. This determines whether only one of the time delay circuits will be effectively connected, or whether both are connected in series.

An ignition timed signal may be traced via a diode 72 from the breaker point switch 31 to the input of a Schimdt trigger that consists of a pair of transistors 73 and 74. This will shape the input pulse to a fast rise pulse. The output of the Schmidt trigger is applied to one input of each of the NOR gates 68 and 69, in parallel. The second input of each of these NOR gates is connected to the $\overline{Q}$ and $\overline{Q}$ outputs of the flip-flop 56. It may be noted that this flip-flop is preferably a dual D-type edge triggered flip-flop. Therefore, when the $\overline{Q}$ output is high the Q is low and vice versa. Thus, either NOR gate 68 or NOR gate 69 will have a low at its second input. Since the output of either of these NOR gates will follow the input on one of its two inputs when the other is low, then clearly either gate 68 or gate 69 will conduct the signals from the Schmidt trigger, but not both. Which gate will conduct, thus of course, depends upon the state of the flip-flop 56.

Now assuming that the second input to gate 68 is low, then the signal will pass and be applied to one input of a NOR gate 77. The second input of this gate 77 will normally be low. Hence, the positive input pulse created at the breaker point switch 31, will appear as a sharp positive pulse at the output of the Schmidt trigger (transistors 73 and 74), a negative pulse at the output of NOR gate 68 and a positive pulse at the output of NOR gate 77. This positive going pulse will be differentiated by a capacitor 78 and a resistor 79. Then it will appear as a single positive pulse at the input of a first transistor 82, which may be part of an integrated circuit unit 83 as indicated by the dashed lines.

The positive pulse or spike at the input of transistor 82 will turn it on momentarily, discharging a capacitor 86 and thus causing a negative pulse to appear at the negative side of capacitor 86. This negative pulse turns off a second transistor 87 and that causes its collector voltage to rise, turning on a third transistor 88 which is in parallel with the transistor 82. Thus, a positive pulse or spike at the input of transistor 82 turns on the transistor 88 which stays on as long as transistor 87 is off. In this condition, the positive side of the capacitor 86 is essentially at ground or zero potential. The negative of capacitor 86 will be charged through a resistor 91 at a rate which depends upon the RC time constant of resistor 91 and capacitor 86.

When the positive charge on the negative side of capacitor 86 reaches approximately 0.7 volts, the transistor 87 will start to conduct and will cause a voltage drop across a resistor 92. This reduces the voltage on the base of the transistor 88 turning it off. At that time the capacitor 86 is charged on the plus side by current flow through the constant current generator illustrated, which consist of a PNP transistor 95, a resistor 96, and resistors 97 and 98. The capacitor 86 will charge until it is again discharged by a successive turning on of the transistor 82.

Since the capacitor 86 is thus charged through a constant current generator (as indicated) the voltage on the pulse side of capacitor 86 will increase linearly with time. And, since the voltage on the negative side is being clamped at approximately 0.7 volts by the forward voltage drop of the base to emitter junction of the transistor 87, it will be clear that the magnitude of the voltage appearing on the plus side of the capacitor 86 will be inversely related to the pulse rate occurring at the input to the transistor 82. If pulses occur very rapidly, the voltage will be small; but if the pulses occur less frequently, then the voltage will be greater.

It may be noted that the magnitude of the negative going pulse on the minus side of capacitor 86 when this capacitor is discharged, is a direct function of the charge and consequently the voltage on the capacitor 86 when it is discharged. Therefore, the off time of the transistor 87 (which has a large voltage on its collector) is inversely proportional to the rate at which trigger pulses are received at the input to this timing system. If the pulses are close together, as in high engine speed, then the "high" of the collector of transistor 87 is short.

It should be noted that a "high" at the collector of the transistor 87 turns on the transistor 54 which, in turn, turns off the transistor 50. Consequently, (as explained above) the turning off of transistor 50 turns on the oscillator 11 and thus produces a high-voltage continuous-wave spark signal. It may be noted also that by proper circuit constants the "on" time of the spark voltage will be essentially a constant amount of crank shaft degrees over the full operating range of speeds of the engine.

When a step change, i.e. a retard, is to be introduced between the engine timed signals and the spark signals that are developed, the flip-flop 56 will be switched over so that Q input to the NOR gate 69 is low. Under these conditions, no signals will pass through the gate 68, and its output will remain low at all times. However, the pulses from the Schmidt trigger (output from transistor 74) will be inverted at the output of the NOR gate 69 and these pulses will be again inverted by another NOR gate 101 which is connected as an inverter. These pulses will appear at the input of a transistor 102 as positive spikes. Each of these positive spikes will turn on the transistor 102 and drive the collector of a transistor 103 positive for a certain time interval as determined by the rate at which the pulses are received at the input to the transistor 102. This is in the same manner as the action described above in connection with the corresponding transistors 82 and 87. Thus, the turning on of transistor 103 will be for a duration that is related to the speed of the engine inversely, and consequently is directly measurable as a fixed number of crank shaft degrees.

It will be observed that when the collector of the transistor 103 returns low at the completion of a timing sequence the pulse is inverted by the NOR gate 77 to which the signal is applied via a circuit connection 106. Then, this pulse appears at the input of the transistor 82 where the timing sequence for the sparking signal is initiated. But, this sparking signal will have been delayed after the initiating pulse, for a predetermined number of crank shaft degrees over the full range of engine speeds.

It will be observed that the timing circuit which was described in connection with the signal passing through NOR gate 69, is substantially like the timing circuit earlier described which includes the transistors 82, 87 and 88 along with the capacitor 86 and the constant current generator transistor 95. Thus, there is a capacitor 109 that corresponds with the capacitor 86, and a transistor 110 that corresponds with the transistor 88. Also there is a PNP transistor 113 that corresponds with the transistor 95. In connection with this timing circuit there is a variable resistor 114 which corresponds to the resistor 91 of the other time delay circuit. It is a feature of this invention that the time delay control which is applied when the pair of time delay circuits are connected in series, may be adjusted to change the amount of retard that is inserted. This may be set to depend upon the fuel that is employed.

It will be appreciated from the foregoing that it would be an easy matter to provide the adjustable resistor 114 with special controls, e.g. by having a rotatable switch (not shown) with steps for changing the resistance of the resistor 114 so that these steps could be calibrated in terms of a particular type of fuel that is to be used in the engine.

While the foregoing description has been set forth in considerable detail in accordance with the applicable statutes, this is not to be taken as in any way limiting the invention, but merely as being descriptive thereof.

I claim:
1. In combination with a controlled-spark-duration ignition system for an internal combustion engine, said system having a high-frequency continuous-wave oscil- lator including a transformer having a high voltage output winding adapted for connection to a sparking circuit, an oscillator control winding on said transformer for starting and stopping oscillation, and electronic switch means comprising a transistor connected in series with said oscillator control winding, trigger means for switching said transistor from conducting to non-conducting state and back, and means for producing an engine timed signal for controlling said trigger means, the improvement comprising a pair of electrical time duration control means each for producing a time delay inversely proportional to the speed of said engine, and circuit means for alternatively connecting only one or both of said time duration control means in series between said engine timed signal and said trigger means, said circuit means comprising
a flip-flop,
a switch for determining the state of said flip-flop, and
a pair of NOR gates controlled by the state of said flip-flop.

2. The invention according to claim 1, wherein
each of said time duration control means comprises electronic circuit means including a plurality of transistors.

3. The invention according to claim 2, wherein
said plurality of transistors and electronic circuit means comprise a first transistor having an input connected to receive said engine timed signal for producing an initiating pulse to said time duration control means,
a capacitor having one side connected to said first transistor output for transmitting said initiating pulse to a second transistor input,
a third transistor having its output connected in parallel with said first transistor output and its input connected to the output of said second transistor for making said third transistor conduct so long as said second transistor is non-conducting,
a fourth transistor connected as a constant current generator feeding said one side of said capacitor, and
a resistor connected to said second transistor input for controlling the time duration of said second transistor's non-conducting state.

4. In combination with a controlled-spark-duration ignition system for an internal combustion engine, said system having a high-frequency continuous-wave oscillator including a transformer having a high voltage output winding adapted for connection to a sparking circuit, an oscillator control winding on said transformer for starting and stopping oscillation, and electronic switch means comprising a transistor connected in series with said oscillator control winding, trigger means for switching said transistor from conducting to non-conducting state and back, and means for producing an engine timed signal for controlling said trigger means, the improvement comprising a pair of electrical time duration control means each comprising
a first transistor having an input connected to receive said engine timed signal for producing an initiating pulse to said time duration control means,
a capacitor having one side connected to said first transistor output for transmitting said initiating pulse to a second transistor input,
a third transistor having its output connected in parallel with said first transistor output and its input connected to the output of said second transistor for making said third transistor conduct so long as said second transistor is non-conducting,
a fourth transistor connected as a constant current generator feeding said one side of said capacitor, and
a resistor connected to said second transistor input for controlling the time duration of said second transistor's non-conducting state,
a flip-flop,
a switch for determining the state of said flip-flop,
a pair of NOR gates controlled by the state of said flip-flop,
first circuit means for connecting said switch to said flip-flop, and
second circuit means for connecting only one of said time duration control means between said engine timed signal producing means and said trigger means when said flip-flop is in one state, and for connecting both of said time duration control means in series between said engine timed signal producing means and said trigger means when said flip-flop is in the other state.

* * * * *